Jan. 12, 1960 G. WHITE 2,920,424
APPARATUS FOR CONTROLLING THE HEATING OF GLASS SHEETS
Filed Dec. 27, 1955

INVENTOR.
Gerald White
BY
Nobbe & Swope
ATTORNEYS

United States Patent Office 2,920,424
Patented Jan. 12, 1960

2,920,424

APPARATUS FOR CONTROLLING THE HEATING OF GLASS SHEETS

Gerald White, Rossford, Ohio, assignor to Libbey-Owens-Ford Glass Company, Toledo, Ohio, a corporation of Ohio Application December 27, 1955, Serial No. 555,700

6 Claims. (Cl. 49—67)

This invention relates generally to the heating of glass sheets, and more particularly to an improved apparatus for controlling the heating of glass sheets to be bent.

The complexly curved and bent glass shapes now being used for glazing and other purposes has made it desirable that in heating a sheet prior to bending, a certain portion of the sheet be heated to a lesser temperature than other portions of the sheet so that the more highly heated portions of the sheet may be formed to relatively sharp and complex curvatures while the cooler sheet portions are being bent to relatively less severe curvatures. This has proved to be particularly the case in the manufacture of bent windshields for use in automobiles. In the so-called panoramic or hook windshields, the opposite ends of the glass sheets used to form such a windshield have a relatively severe longitudinal curvature formed therein while the central portion of the sheet, intermediate the ends thereof, is formed to a relatively shallow longitudinal curvature.

In the case of cap windshields, a longitudinal curvature similar to that used in panoramic windshields is used and, in addition, a transverse curvature is formed in the central portion of the sheet and extends outwardly towards the ends thereof a limited distance.

The production of windshields of such a type by the conventional methods of bending glass sheets has proved to be extremely difficult and, in some cases, virtually impossible unless the heating of preselected portions of the glass sheets to be bent is retarded, or the heating of other portions of the sheet is accelerated.

It is, therefore, an important object of the present invention to provide an improved apparatus for controlling the heating of glass sheets to be bent.

Another object of the invention is to provide an improved apparatus for retarding the heating of selected portions of a glass sheet to be bent.

Another object of the invention is to provide an improved heat absorbing member adapted to be mounted on a glass bending mold.

A further object of the invention is to provide a novel means to cool the heat absorbing member.

Other objects and advantages of the invention will become more apparent during the course of the following description when taken in connection with the accompanying drawings.

In the drawings, wherein like numerals are employed to designate like parts throughout the same:

Briefly stated, the present invention provides an apparatus for controlling the heating of a glass sheet to be bent which includes a bending mold having associated therewith an improved type of heat absorbing member adapted to retard the heating of selected portions of a glass sheet, and means for maintaining the heat absorbing member relatively cool as compared to the glass sheet to be bent. In addition, the invention includes a novel method of cooling the heat absorbing member which method influences the manner in which the heating of the glass sheet is retarded.

Figure 1:
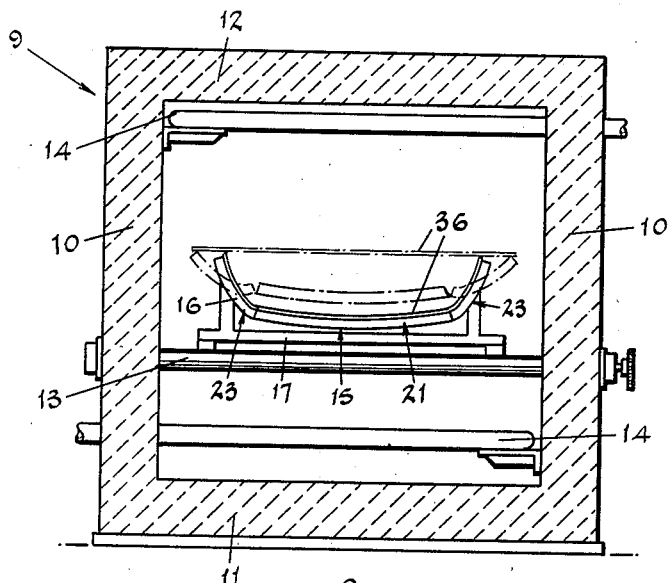
Fig. 1 is a transverse sectional view through a typical bending furnace in which glass sheets may be bent in accordance with the invention.

With reference now to the drawings, and particularly to Fig. 1, there is shown in sectional view a bending furnace 9 having upstanding side walls 10, a bottom wall 11 and a roof 12. To convey bending molds supporting glass sheets to be bent through the furnace, a plurality of rotatable rolls 13 are provided upon which the supporting rack of the mold travels.

The furnace 9 may be heated by means of radiant tubes 14 disposed both above and below the conveyor rolls 13 and adapted to direct radiant heat toward the path of the bending molds carried upon the conveyor. If desired, a furnace of the type shown in the co-pending application Serial No. 470,424 of Gerald White and William P. Bamford, now abandoned, may be used in place of a radiant tube furnace.

Figure 2:
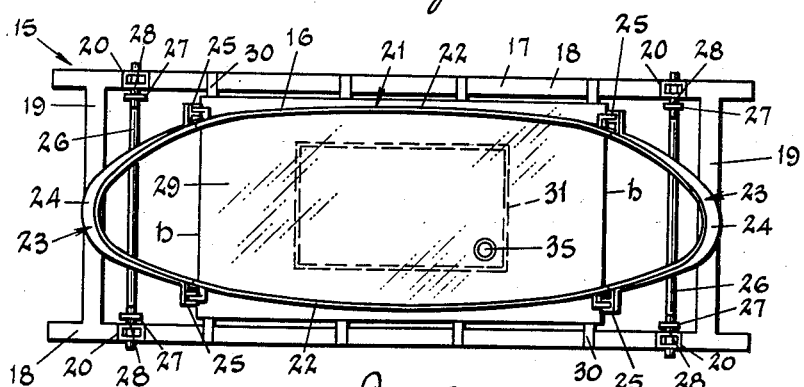
Fig. 2 is a plan view of a bending mold having associated therewith the novel heat absorbing member of the invention.
Figure 3:
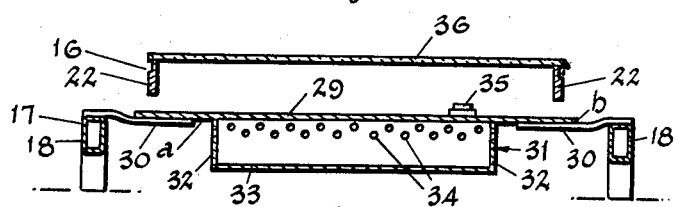
Fig. 3 is a transverse section taken along the line 3—3 of Fig. 1.

The bending apparatus 15 shown in Fig. 2 includes one type of bending mold 16 with which the improved heat absorbing member of the invention may be associated, which mold is supported above a rack 17. The rack 17 is substantially rectangular and comprises spaced side bars 18 joined to one another at their outermost ends by end bars 19. Extending upwardly from each of the side bars, adjacent the outermost ends thereof, are column members 20 which support the mold 16.

The mold 16 is of the commonly used outline type and comprises a center section 21 formed of a pair of spaced shaping rails 22, and aligned end sections 23 having the shaping rail 24 thereof movably joined to the center section by hinges 25. In accordance with well-known practice, the upper surface of the rails 22 and 24 is finished and contoured to provide a curved shaping surface into conformity with which a glass sheet is bent. The mold 16 is supported for movement from an open position (phantom lines in Fig. 1) to a closed position (full lines in Fig. 1) by means of a transverse bar 26 secured to each of the end sections 23 and extending outwardly therefrom to have its opposite ends rotatably received in links 27 swingably secured by pins 28 to the columns 20.

As shown in Fig. 1, the center section rails 22 of the mold describe a surface of relatively shallow curvature while the opposite end section rails 24 are curved and aligned in such a manner as to describe a surface of relatively sharp curvature. A mold of this general curvature is commonly used in bending panoramic or hook type windshields. In bending such windshields, it is desirable that the sharply curved portions of the bent sheet, which correspond roughly to the mold end sections 23, are heated to a higher temperature as compared to the sheet portion corresponding to the center section 21 of the mold. Therefore, it is necessary that a differential heating of the sheet be effected. Generally speaking, this differential heating may be accomplished in one of two ways, first, additional heat may be concentrated upon the end portions of the sheet to raise these portions to a higher temperature than the central portion, or the heating of the central portion of the sheet may be retarded with respect to the end portions. It has been found preferable to retard the heating of the central portion of the sheet since, by so doing, the tendency of the sheet to sag between the supported longitudinal edges thereof and thus produce an unacceptable degree of sag is eliminated because the temperature of this portion of the sheet is maintained below that at which the objectionable amount of sag will develop.

According to the present invention, the retarding of the heating of the central portion of the sheet is effected by means of a heat absorbing member mounted on the mold beneath the shaping surface and having means associated therewith to continuously cool the same.

As shown in Fig. 2, a metallic plate 29 is mounted beneath the shaping surface of the bending mold, defined by the rail sections 22 and 24, and supported upon the rack side bars 18 by means of transverse rods 30. The plate 29 may be of rectangular construction and of greater width than the distance between the side rails 22 of the mold and of a length corresponding roughly to the center section 21 thereof so that the major portion thereof is within the confines of the projected periphery of the mold shaping surface. Secured to the undersurface $a$ of the plate is a metallic container or reservoir 31 having side walls 32 joined to the undersurface $a$ of the plate, and a bottom wall 33 extending between said side walls and joined thereto. Spaced downwardly a limited distance from the lower surface $a$ of the plate and in the side walls 32 are a plurality of holes 34. To fill the container 31 with fluid, a capped opening 35 is provided in the plate 29 above said container.

The size of the container 31, and the distance between the side walls 32 thereof and the peripheral edge $b$ of the plate 29 will vary depending on the heat output of the furnace and the desired amount of heat absorption desired in the plate 29. For example, if an extensive amount of heat absorption is demanded of the plate 29, the side walls 32 of the container may be spaced closely adjacent the plate edges $b$. If a lesser amount of heat absorption is required, the walls 32 are spaced a greater distance from the plate edge $b$. For most uses, it has been found desirable to space the side walls 32 inwardly from the peripheral edge of the plate approximately as shown in Fig. 2.

In accordance with the use of the invention, a glass sheet 36 is placed upon the bending mold 16 prior to passing the mold through the furnace 9, and the container 31 is filled with water to a level slightly beneath the holes 34. The mold having the glass sheet supported thereon is then passed through the furnace 9 wherein the glass sheet is passed through successive zones of increasing temperature. As the mold moves through the furnace, the water in the container 31 becomes heated to the boiling point and steam is produced which passes outwardly through the openings 34. Since the steam tends to rise, it has a tendency to move outwardly along the undersurface $a$ of the plate 29 thus tending to cool said plate which, by the time the water has begun boiling, is at a considerably higher temperature than the boiling point of the water. Thus, the metallic plate, which in itself acts as a heat absorber and withdraws heat from the furnace atmosphere thereabove roughly corresponding to the central portion of the glass sheet, is able to withdraw a greater amount of heat from the furnace atmosphere and from the glass sheet due to the cooling effect of the steam in contact with the lower surface $a$ thereof. Since the metallic plate 29 is substantially coextensive with the center section 17 of the mold, a corresponding portion of the glass sheet 36 has the heating thereof retarded both by the withdrawal of heat from the furnace atmosphere adjacent thereto by the heat absorbing qualities of the metallic plate, and also due to the black body effect of the plate. That is, the plate is always at a lower temperature than the glass sheet and thus tends to absorb radiant heat therefrom.

It was previously mentioned that the invention included a method of cooling the heat absorbing plate 29. It will be understood, of course, that if the plate is used, for example, to retard the heating of the central portion of the sheet, that the maximum amount of cooling should be applied to the sheet midway between the side rails 22 of the center mold section 21 and less cooling applied to the sheet portions closer to the side rails since, when the sheet is resting upon the side rails, the bending moment is at a maximum midway between the side rails and decreases as it approaches the side rails. By positioning the side walls 32 of the container 31 inwardly from the peripheral edge $b$ of the plate 29, the portion of the plate 29 between the side walls 32 has the maximum cooling applied thereto since the undersurface $a$ of that portion of the plate "sees" the water within the container 31 and also because the steam contacts this portion of the plate while at its minimum temperature. While escaping through the holes 34 and moving outwardly along the undersurface $a$ of the plate, the steam becomes heated to a higher temperature by the furnace atmosphere and thus is not able to withdraw as much heat from the plate. Therefore, as the steam approaches the plate edge, the cooling effect on the plate is progressively lessened.

Thus, there is provided a varying temperature gradient in the plate which has the effect of applying maximum cooling to the glass sheet midway between the longitudinal edges thereof and a progressively lessening amount of cooling to the sheet portions closest to the sheet edges.

For most bends, it is only necessary to retard the heating of the glass sheet to be bent prior to the sheet being bent into contact with the mold shaping surface. However, in some instances, it is usually desirable to continue the retarding of portions of the glass sheet after the sheet contacts the mold shaping surface. In such cases, the size of the container, or reservoir, 31 is made sufficient to contain the increased amount of water necessary to produce steam for a longer time interval, or suitable substances may be added to the water to increase the boiling point.

By way of illustrating the invention, the plate 29 has been shown to be approximately coextensive in size with the central portion of the glass sheet to be bent. It will be readily appreciated that if smaller or different areas of a glass sheet to be bent are to have the heating thereof retarded, the shape of the plate may be readily altered or placed in a different position on the mold. For example, if it is desired to bend a sheet about both the longitudinal and transverse axes thereof, a heat absorbing member of the type herein disclosed may be positioned adjacent one longitudinal marginal area of a mold to locate the line of maximum transverse curvature in the sheet, or a pair of the members may be transversely spaced from one another so that the line of maximum curvature may be located therebetween.

It is to be understood that the form of the invention herewith shown and described is to be taken as a preferred embodiment of the same, and various changes may be resorted to without departing from the spirit of the invention or the scope of the subjoined claims.

I claim:

1. In a glass bending mold, a curved shaping surface for receiving a bent glass sheet in contact therewith, a heat absorbing member mounted on the mold beneath said shaping surface and having a portion thereof within the projected periphery of said shaping surface, and an open top reservoir for containing a liquid mounted beneath said heat absorbing member.

2. In a glass bending mold, a skeleton or outline type curved shaping rail, a metallic plate mounted on the mold beneath said shaping rail and having a first surface facing said shaping rail and a second surface facing away from said shaping rail, and a reservoir adapted to contain a liquid mounted on the mold, said reservoir comprising side walls and a bottom wall, said side walls being joined to the second surface of said plate and having openings therein spaced downwardly a limited distance from said second surface.

3. In a glass bending mold as defined in claim 2, wherein the reservoir is positioned within the projected periphery of the mold shaping rail.

4. In a glass bending mold as defined in claim 2, wherein the side walls are spaced inwardly from the edges of the plate.

5. In a glass bending mold, a curved shaping surface for receiving a bent glass sheet in contact therewith, a heat absorbing member mounted on the mold beneath and spaced from said shaping surface, and an open top reservoir for containing a cooling substance mounted on the mold beneath said heat absorbing member.

6. In a glass bending mold, an outline type curved shaping rail, a metallic plate mounted on the mold beneath said shaping rail and having a surface thereof facing said shaping rail, and a reservoir adapted to contain a liquid mounted on the mold adjacent to and facing the opposite surface of said plate, said reservoir comprising side walls and a bottom wall, said side walls being spaced inwardly from the edges of said plate, said side walls being joined to the adjacent surface of said plate and having openings therein spaced downwardly a limited distance from said surface.

References Cited in the file of this patent

UNITED STATES PATENTS

| | | | |
|---|---|---|---|
| 199,583 | Siemens | Jan. 22, | 1878 |
| 858,484 | Thompson | July 2, | 1907 |
| 877,729 | Owens | Jan. 28, | 1908 |
| 1,454,200 | Wells et al. | May 8, | 1923 |
| 1,928,254 | Henze | Sept. 26, | 1933 |
| 1,981,560 | Littleton | Nov. 20, | 1934 |
| 2,106,193 | Sloan | Jan. 25, | 1938 |
| 2,142,445 | Helwig | Jan. 3, | 1939 |
| 2,248,714 | Lytle | July 8, | 1941 |
| 2,297,314 | Offen | Sept. 29, | 1942 |
| 2,348,278 | Boyles et al. | May 9, | 1944 |
| 2,448,514 | Butler | Sept. 7, | 1948 |
| 2,720,729 | Rugg | Oct. 18, | 1955 |

FOREIGN PATENTS

| | | | |
|---|---|---|---|
| 616,445 | Germany | July 4, | 1935 |